United States Patent

Seki et al.

[15] 3,643,159
[45] Feb. 15, 1972

[54] COUNTING DEVICE FOR MEASURING REPETITION RATE OF PULSE SIGNAL

[72] Inventors: Kunio Seki, Higashimurayama-shi; Koji Matsumura, Kodaira-shi, both of Japan

[73] Assignee: Hitachi, Ltd., Tokyo, Japan

[22] Filed: Sept. 12, 1969

[21] Appl. No.: 857,421

[30] Foreign Application Priority Data

Sept. 14, 1968 Japan..................................43/66472
Nov. 8, 1968 Japan..................................43/81254

[52] U.S. Cl...............................................324/169, 307/273
[51] Int. Cl...........................................................G01p 3/48
[58] Field of Search.............324/69, 70, 78 I, 78 E, 166–175; 307/273

[56] References Cited

UNITED STATES PATENTS 3,222,550   12/1965   Willard ..........................324/166 UX

FOREIGN PATENTS OR APPLICATIONS 264,922   4/1964   Australia ...............................324/169

*Primary Examiner*—Michael J. Lynch
*Attorney*—Craig, Antonelli & Hill

[57] ABSTRACT

A counting device for measuring the repetition rate of a pulse signal which uses a monostable multivibrator including a constant-voltage diode connected in parallel with one of two switching elements which are connected in a monostable multivibrator configuration, thereby producing a measuring output signal which is independent of any voltage change in the operating power source for the monostable multivibrator.

8 Claims, 15 Drawing Figures

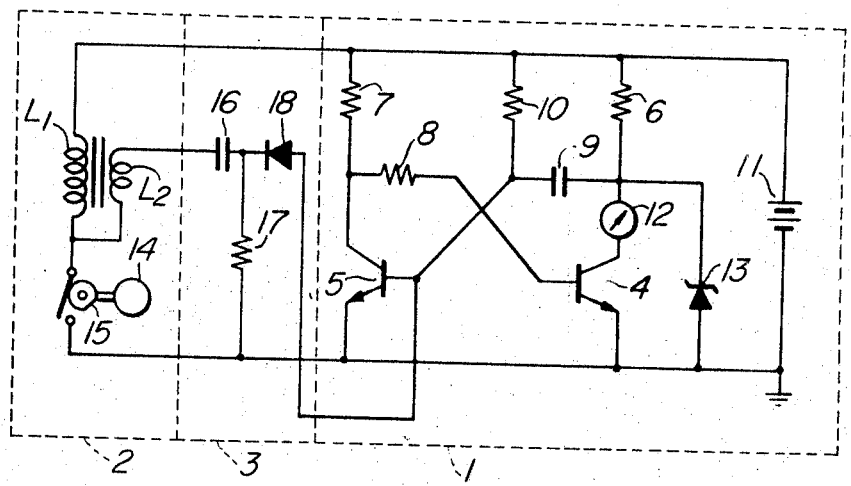
FIG. 1
FIG. 2a $P_t$
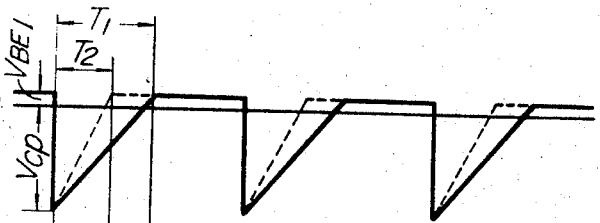
FIG. 2b $V_{BE2}$
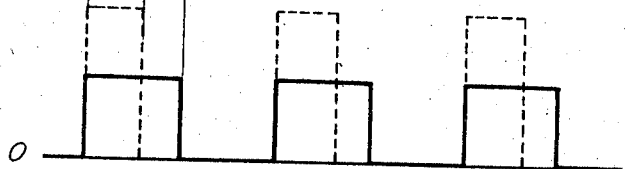
FIG. 2c $I_c$
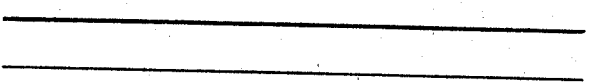
FIG. 2d $I_{Cav}$

COUNTING DEVICE FOR MEASURING REPETITION RATE OF PULSE SIGNAL

This invention relates to a counting device for measuring the repetition rate of a pulse signal, and more particularly it pertains to such a device using a monostable multivibrator.

As is well known in the art, such a counting device using a monostable multivibrator is applied to a tachometer for measuring the rotational frequency of an automobile engine for example. In a tachometer of this type, an electric pulse signal is generated in accordance with the rotational speed of the engine, such a pulse signal is converted to a trigger pulse signal, and the latter is supplied to the monostable multivibrator, thereby measuring the number of the electric pulse signal or the rotational frequency of the engine.

The measuring accuracy of this counting device depends largely upon the rate of change of the operating voltage applied to the monostable multivibrator constituting the counting device. That is, if the operating voltage is changed, then the quasi-stable time of the monostable multivibrator and the magnitude of a current flowing through the monostable multivibrator in the quasi-stable state are varied so that an error occurs in the detection signal.

In order to eliminate such an error in the detection signal, a stabilized power source with a high stability is required as an operating power source for the monostable multivibrator. Especially, a counting device applied to the tachometer of an automobile engine should be connected with a storage battery, which serves as the operating power source for the monostable multivibrator, through a voltage stabilizing means that has a high stability.

Disadvantageously, however, the use of such voltage-stabilizing means leads to a substantial increase of the manufacturing cost of the counting device and an increased power consumption.

Accordingly, it is an object of the present invention to provide an improved counting device which is so designed as to operate substantially irrespective of any voltage change in the operating power source.

Another object of the present invention is to provide an improved counting device with a minimum power consumption.

Another object of the present invention is to provide a counting device capable of counting a high-speed pulse signal having a high repetition rate.

Still another object of the present invention is to provide an improved tachometer for detecting a rotational frequency of an automobile engine.

A further object of the present invention is to provide a counting device which can be conveniently miniaturized in the field of microelectronics.

A still further object of the present invention is to provide an inexpensive counting device.

The gist of the present invention resides in that a constant-voltage diode or zener diode is connected in parallel with one of two switching elements connected in monostable multivibrator configuration so that the quasi-stable time and magnitude of the quasi-stable current of the monostable multivibrator are changed in opposite directions in accordance with power source variations, thereby compensating for a detection signal with respect to power source variations in the monostable multivibrator.

Other objects, features and advantages of the present invention will become apparent from the following description taken in conjunction with the accompanying drawings, in which:

FIG. 1 is a circuit diagram showing the counting device according to an embodiment of the present invention as applied to a tachometer for an automobile engine;

FIGS. 2a to 2d are views showing waveforms occurring in various portions of the counting device embodying the present invention, respectively;

Figure 3:
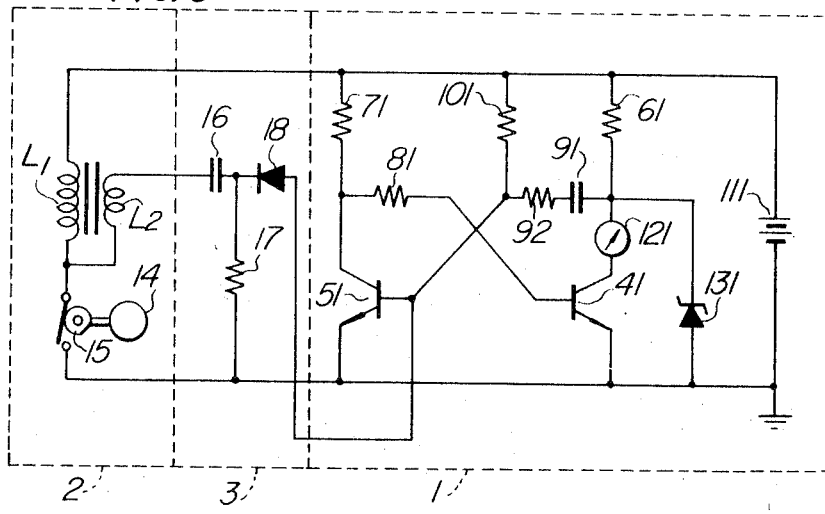
Figure 4:
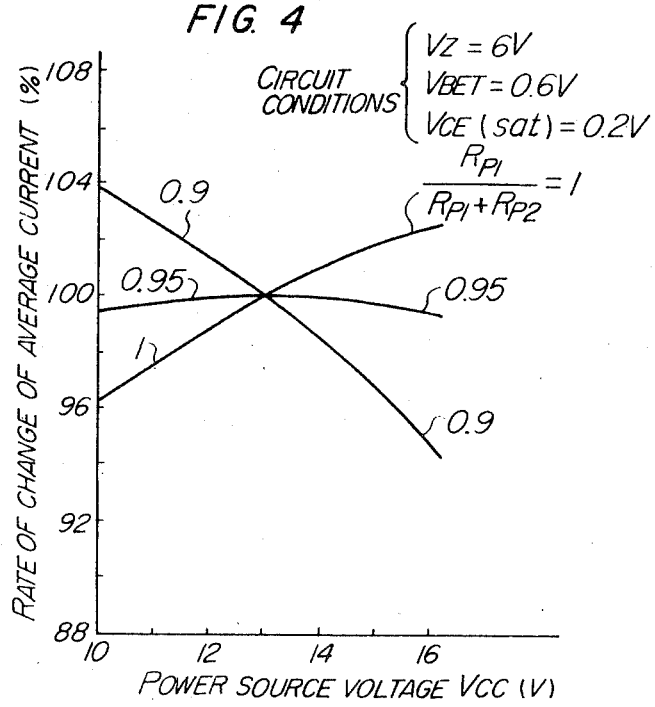
Figure 5:
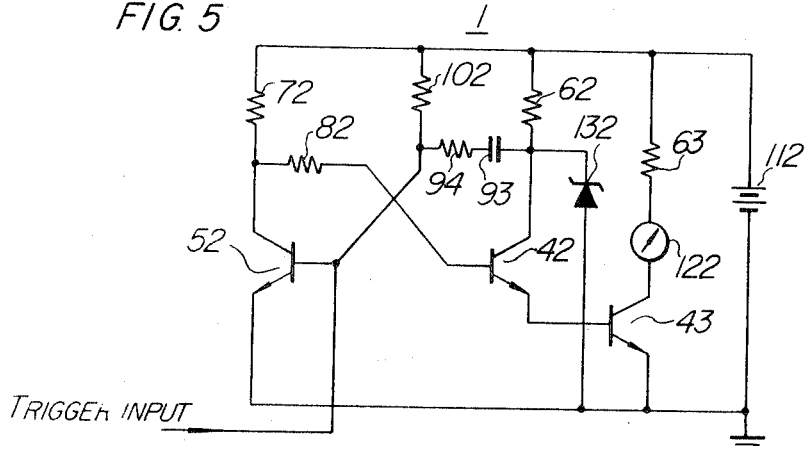
Figure 6:
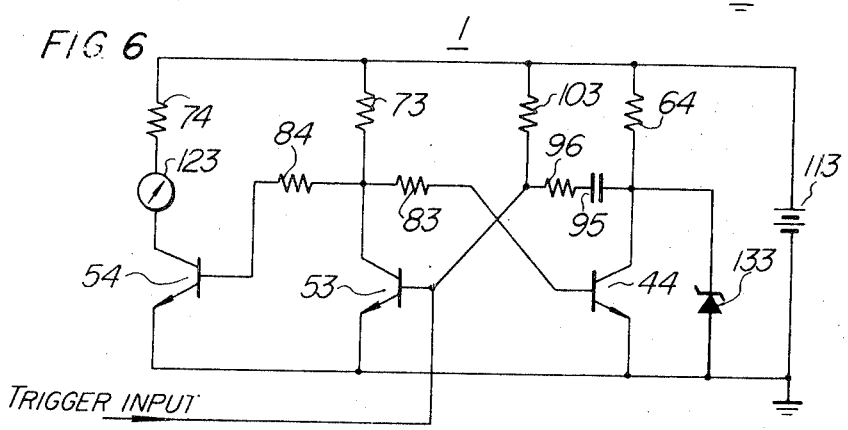
Figure 7:
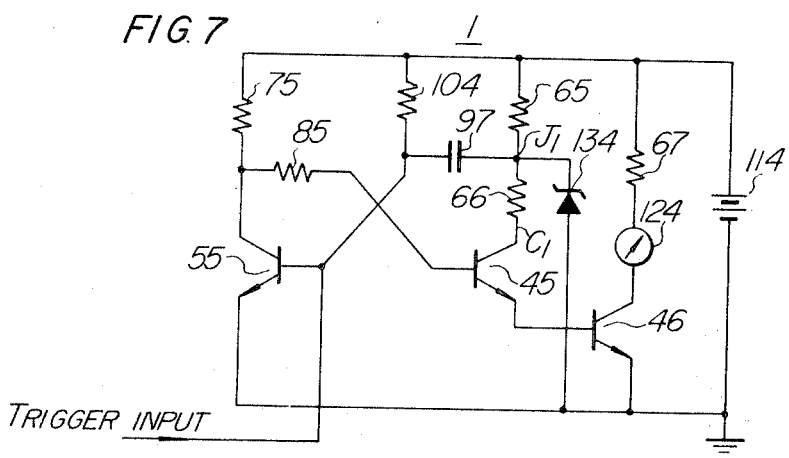
Figure 8:
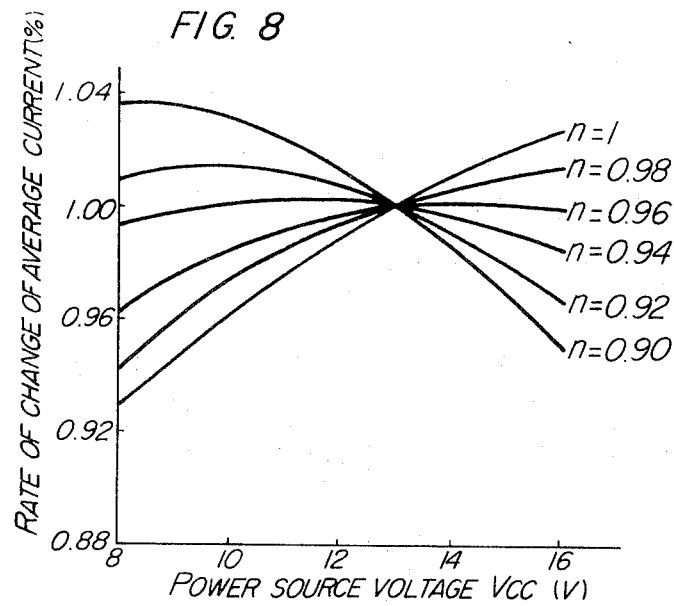
Figure 11:
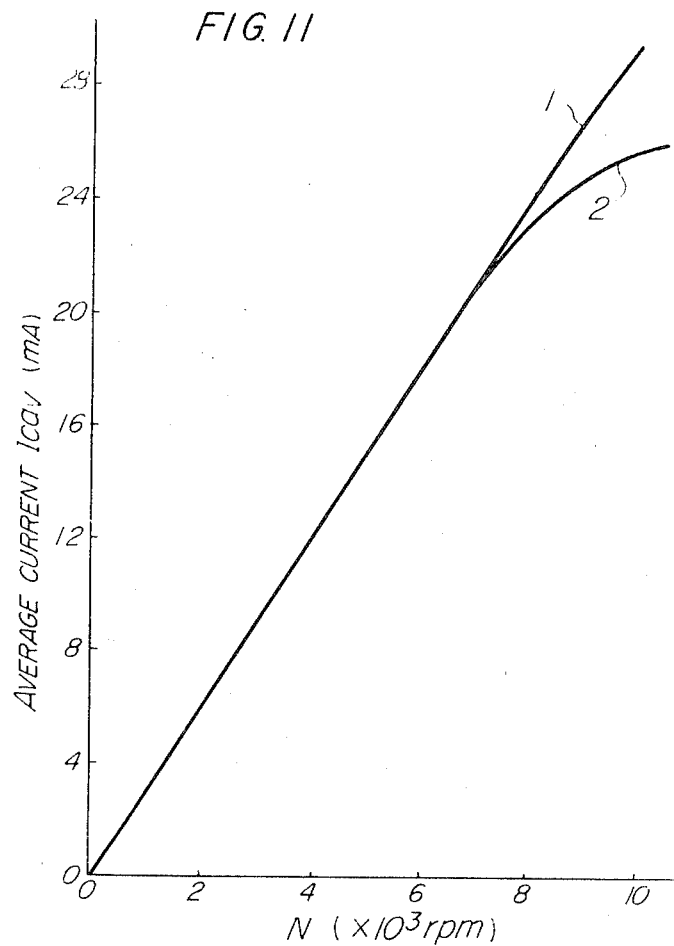

FIGS. 3, 5, and 6 are circuit diagrams showing the counting devices according to second, third and fourth embodiments of the present invention, respectively;

FIG. 4 is a view showing the characteristics of the counting device shown in FIG. 3;

FIGS. 7, 9, 10, and 12 are circuit diagrams showing the counting devices according to fifth, sixth, seventh, and eighth embodiments of the present invention, respectively;

FIG. 8 is a view showing the characteristics of the counting device shown in FIG. 7; and FIG. 11 is a view showing the characteristics of a tachometer for an engine which utilizes the counting device embodying the present invention.

The counting device of the present invention will be described in detail as applied to a tachometer for an engine.

The power supply to such circuits as an ignition circuit device or a lighting device for the engine of an automobile is provided by a storage battery installed on the automobile. To this end, care should be taken so that the respective circuits of the automobile are operated irrespective of voltage variations in the battery. This is also true of the tachometer to which power is provided by the battery.

As will be appreciated from the following description, the present invention can be effectively applied to a counting device to which an operating potential is provided by a power source in which remarkable voltage variations tend to occur.

Referring to FIG. 1, there is shown a first embodiment of the present invention, wherein numeral 1 represents a monostable multivibrator circuit which is constituted by a first inverter stage including a transistor 4 and load resistor 6, a second inverter stage including a transistor 5 and load resistor 7, a feedback resistor 8 for connecting the input terminal of the first inverter stage with the output terminal of the second inverter stage, a feedback capacitor 9 for connecting the output terminal of the first inverter stage with the input terminal of the second inverter stage, and a bias resistor 10 for rendering the transistor 5 of the second inverter stage conductive in the steady state. Numeral 11 indicates a storage battery for supplying an operating potential to the monostable multivibrator 1, and 12 a detector meter constituted by a moving-coil ampere meter for detecting current variations (average current) in the monostable multivibrator 1. Numeral 13 denotes a constant-voltage element such as a zener diode inserted between the output terminal of the first inverter stage and a common terminal, and 2 a pulse-generating circuit adapted for generating pulses in synchronism with the rotation of this engine, which is constituted by an inductance coil $L_1$ connected with the power source 11 for example, an inductance coil $L_2$ which is electromagnetically coupled to the inductance coil $L_1$, and switching means 15 connected mechanically with the engine 14 so as to be electrically turned on and off by the rotation of the engine. This pulse-generating circuit generates pulses proportional in number to the rotational frequency of the engine. Numeral 3 represents a circuit means for applying the pulse generated by the pulse-generating circuit to the monostable multivibrator 1 as a trigger pulse and which may be constituted by a differentiating circuit means consisting of a capacitor 16 and resistor 17 for example, and diode device 18 for imparting only negative pulses available from the differentiating circuit means to the monostable multivibrator.

Waveforms occurring in various portions of the counting device are as shown in FIG. 2. That is, FIG. 2a shows a trigger pulse $P_t$ generated in synchronism with the rotation of the engine so as to be supplied to the base of the transistor 5; FIG. 2b shows the base potential $V_{BE2}$ of the transistor 5; FIG. 2c shows the conduction current $I_c$ of the transistor 4; and FIG. 2d shows the average current $I_{cav}$ of the current $I_c$.

The average current $I_{cav}$ referred to above is proportional to the number of trigger pulses $P_t$ generated per unit time or the rotational frequency of the engine. Thus, it is possible to determine the rotational frequency $N$ of the engine by detecting the average current $I_{cav}$ of the monostable multivibrator, as shown in FIG. 11.

With the foregoing arrangement, the voltage $V_{cp}$ across the capacitor 9 in the steady stage of the monostable multivibrator is given by $V_{cp}=V_Z-V_{BET}$ irrespective of voltage variations in the power source, where $V_Z$ is the reference voltage of the constant-voltage element 13 and $V_{BET}$ is the threshold voltage of the transistor 5. Thus, in a quasi-stable state (the transistor 5 is in the conducting state), the maximum bias voltage $V_{BE2}$ applied to the transistor 5 becomes constant or equal to $V_{CP}(=V_Z-V_{BET})$, as shown in FIG. 2b.

Consider a change of the quasi-stable time T which is caused with a variation in the voltage $V_{CC}$ of the battery 11. If it is assumed that the initial quasi-stable time is $T_1$ as shown in FIG. 2b, then the charging time of the capacitor 9 in the quasi-stable state is reduced or becomes shorter than the initial time $T_1$ when the power source voltage $V_{CC}$ is increased, as shown by dashed lines in FIG. 2b. When the power source voltage $V_{CC}$ is decreased on the contrary, the quasi-stable time becomes longer. Thus, it is possible to make the quasi-stable time T inversely proportional to the power source voltage $V_{CC}$ by virtue of the action of the constant-voltage element 13.

The conduction current flowing through the transistor 4 in the quasi-stable stage is given by $V_{CC}/(R_{cl}+R_m)$ where $R_m$ is the internal resistance of the detector meter 12 and $R_{cl}$ is the resistance value of the resistor 6. That is, the conduction current is proportional to the power source voltage $V_{CC}$. The condition where the power source voltage $V_{CC}$ is increased is shown by the dashed lines in FIG. 2c.

Thus, in accordance with the present invention, any change in the quasi-stable time of the monostable multivibrator is compensated for by a variation in the quasi-stable current, so that the average current $I_{cav}$ of the monostable multivibrator can be made independent of any variation in the power source.

Furthermore, power loss in the constant-voltage element 13 occurs only in the stable state of the monostable multivibrator, and it is possible to provide a high resistance value for the load resistor 6 connected in series with the constant-voltage element 13. Consequently, it is possible to make the power loss remarkably low as compared with the case where such a constant-voltage element is utilized as a stabilized power source device as in the prior art.

Referring to FIG. 3, there is shown a second embodiment of the present invention, which is differentiated from the embodiment in FIG. 1 in that the capacitive feedback circuit of the monostable multivibrator circuit is constituted by a series circuit of a resistor 92 and capacitor 91. The quasi-stable time T of this arrangement is given by $$T = (R_{p1}-R_{p2})C_p \ln \frac{R_{p1}}{R_{p1}-R_{p2}} \frac{V_{cc}+V_Z-V_{BET}-V_{CE(sat)}}{V_{cc}-V_{BET}} \quad (1)$$

neglecting the internal resistance of a detector meter 121, where $V_{BET}$ is the threshold voltage of the transistor, $V_{CE}$(sat) is the voltage drop (saturation voltage) when the transistor is turned on, $R_{P1}$ is the resistance value of a resistor 101, $R_{P2}$ is the resistance value of the resistor 92, $C_P$ is the capacitance value of the capacitor 91, $V_Z$ is the reference voltage of the constant-voltage element 131, and $V_{cc}$ is the voltage of the power source 111. Thus, it is possible to substantially eliminate any change in the average current with respect to a variation in the power source voltage by suitably selecting the value of $R_{P1}/(R_{P1}+R_{P2})$. FIG. 4 shows the rate of change of the average current $I_{cav}$ with a change in the power source voltage $V_{cc}$, from which it will be seen that any change in the average current $I_{cav}$ can be substantially eliminated by selecting $R_{P1}/(R_{P1}+R_{P2})$ to 0.95. In the preferred embodiment of the present invention, a resistor is inserted in the capacitive feedback circuit.

Referring to FIGS. 5 and 6, there are shown the main portions of third and fourth embodiments of the present invention respectively, wherein resistors 94 and 96 are inserted in the capacitive feedback circuit of the monostable multivibrator circuit 1 and third amplifying elements 43 and 54 are connected with ampere meters 122 and 123 for the purpose of improving the detection sensitivity respectively.

The counting device according to the present invention is capable of producing such a concomitant effect as to minimize output variations with temperature variations. Generally, a capacitor incorporated in a capacitive feedback circuit has a positive temperature coefficient, so that the capacitance thereof is varied with a temperature variation. For this reason, as ambient temperature increases, the time constant of the monostable multivibrator becomes longer, so that the quasi-stable time thereof becomes longer. The internal resistance of the ampere meter (resistance of the moving coil) also has a positive temperature coefficient, and therefore it increases as the temperature rises. Such resistance increase serves to limit a current flowing through the ampere meter in the quasi-stable state. Thus, even if the quasi-stable time is increased as a result of a temperature rise, the conduction current in the quasi-stable state is decreased so that the average current $I_{cav}$ is made substantially independent of the temperature. In this case, the rate of change of the conduction current with the temperature in the quasi-stable state can be controlled by changing the value of the load resistor (63 or 74) connected in series with the detector meter in accordance with the internal resistance $R_m$ of the ampere meter.

Referring to FIG. 7, there is shown the main portion of a fifth embodiment of the present invention, characterized in that a resistor 66 is inserted between the collector electrode $C_1$ of a switching element 45 incorporated in the monostable multivibrator 27 and the connection point $J_1$ between capacitor 97 and resistor 65.

The insertion of the resistor 66 results in complete compensation for the power source voltage $V_{CC}$ as in the case where the resistor is inserted in the capacitive feedback circuit as described above. On the assumption that the quasi-stable time of the monostable multivibrator is T, the following equation holds:

$$T = C_P \left( R_{P1} + \frac{R_{C1}R_{C2}}{R_{C1}+R_{C2}} \right) \ln \left( \frac{R_{P1}}{R_{P1} + \frac{R_{C1}R_{C2}}{R_{C1}+R_{C2}}} \right)$$

$$\left( \frac{\frac{R_{C1}}{R_{C1}+R_{C2}} V_{CC}' + V_Z'}{V_{CC}-V_{BET}} \right) \quad (2)$$

where
$C_P$: capacitance of 97
$R_{P1}$: resistance of 104
$R_{C1}$: resistance of 65
$R_{C2}$: resistance of 66
$V_{CC}$: voltage of 114
$V_{BET}$: threshold voltage of 55
$V_{CC}' = V_{CC}-V_{CE(sat)1}-V_{BE3} \approx V_{CC}$
  ($V_{CE(sat)1}$: saturation voltage of the transistor 45, $V_{BE3}$: threshold voltage of the transistor 46)
$V_Z' = V_Z-V_{BET} \approx V_Z$
  ($V_Z$: reference voltage of the zener diode 134, $V_{BET}$: the threshold voltage of the transistor 55)

On the assumption that $R_{P1}>>R_{C1}R_{C2}/(R_{C1}+R_{C2})$, equation (2) may be rewritten as follows:

$$T \approx 2.3 C_P R_{P1} \log[(nV_{CC}+V_Z)/V_{CC}] \quad (3)$$

where $n=R_{C1}/(R_{C1}+R_{C2})$.

As will be apparent from equation (3), the quasi-stable time T can be adjusted by means of the resistance $R_{C2}$. Furthermore, it is also possible to control the dependence of the quasi-stable time T on the power source voltage $V_{CC}$ by adjusting $R_{C2}$.

FIG. 8 shows variations in the average current $I_{cav}$ with respect to the power source voltage $V_{CC}$ with the rotational frequency maintained constant, wherein n in equation (3) is changed by adjusting the resistance $R_{C2}$. As will be appreciated from these characteristic curves, complete compensation for the power source $V_{CC}$ can be achieved by the adjustment of the resistance $R_{C2}$.

With this embodiment, the charging time of the capacitor 97 when the transistors 45 and 46 are rendered nonconductive (hence the transistor 55 is rendered conductive) is not affected by the compensation resistor 66 since the latter is inserted between the collector $C_1$ of the transistor 45 and the connection point $J_1$ to which one end of the constant-voltage element 134 is connected. Thus, it is possible to detect a high rotational frequency. In FIG. 11, a curve 1 shows the relationship of the average current $I_{cav}$ to a rotational frequency $N$, which represents an improved linearity as compared with a curve 2 which corresponds to the case where compensation for power source variations is effected by connecting the resistor 92 in series with the capacitor 91 as shown in FIG. 3. In this way, the measuring range for the rotational frequency can be extended.

Figure 9:
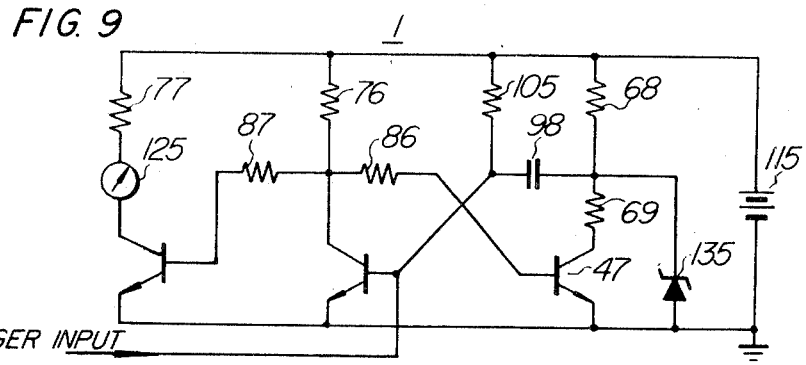
Figure 10:
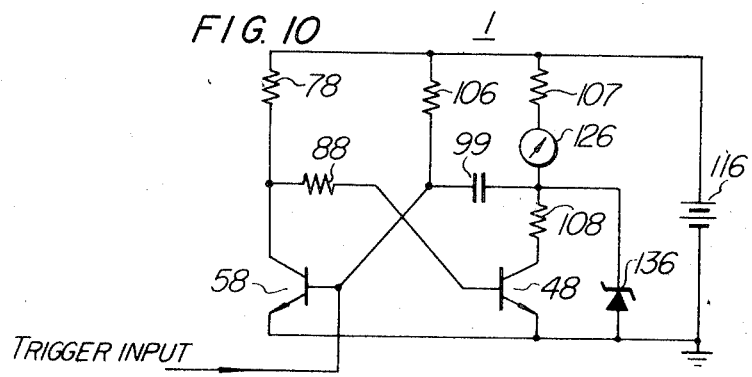

Referring to FIGS. 9 and 10, there are shown sixth and seventh embodiments of the present invention, wherein the design is made such that complete compensation for power source variations is effected by connecting resistors 69 and 108 in series with switching elements 47 and 48 respectively as in FIG. 7.

Figure 12:
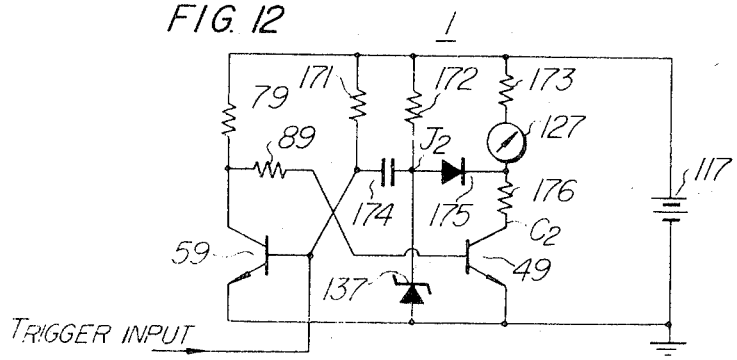

FIG. 12 shows the main portion of an eighth embodiment of the present invention including a modified form of a zener diode circuit. In the foregoing embodiments, the load resistor was used in common for the zener diode and switching element, while in the circuit of FIG. 12, separate load resistors are employed. More specifically, current limitation for the zener diode 137 is effected with the aid of a resistor 172, and current limitation for the switching element 49 is effected with the aid of a resistor 173. Thus, the resistance value of the load resistor associated with the zener diode can be selected independently of the switching element so as to be able to obtain a desired zener current. Consequently, it is possible to reduce any undesired power consumption in the zener diode.

As described above, in accordance with the present invention, it is possible to compensate for power source variations by means of a relatively simple circuit arrangement. Furthermore, since power loss in the device per se is remarkably low, the present invention can be effectively applied to a counting device to which power is provided by a simple power source device such as, for example, storage battery as in the case of an automobile.

In the foregoing, the present invention has been described as applied to a tachometer for the engine of an automobile. However, it is to be understood that the present invention is by no means limited to such a tachometer, and that generally it can be applied to a counting device for measuring the repetition rate of a pulse signal. Various modifications will become possible without departing from the spirit and scope of the present invention.

We claim:

1. A counting device comprising:
   a. a monostable multivibrator circuit including first and second conductive lines,
   a voltage supply for applying an energizing potential connected between said first and second conductive lines,
   first and second switching elements each having first and second electrodes separated by a conductive path for said switching elements, and a control electrode for controlling the conductivity of the conductive path,
   a series circuit of a first load resistor and a zener diode directly connected between said first and second conductive lines so that one end of the load resistor in said series circuit is connected with said first conductive line, and one end of said zener diode is directly connected to said second conductive line,
   first direct current conductive means for connecting each of said second electrodes directly with said second conductive line,
   a second load resistor connected between the first electrode of said first switching element and said first conductive line,
   second direct current conductive means for connecting said first electrode of said second switching element with the junction of said first load resistor and said zener diode so as to make said first load resistor act as a load for said second switching element in the conductive state thereof and as a load for said zener diode in the nonconductive state of said second switching element,
   third direct current conductive means for coupling said first electrode of said first switching element to the control electrode of said second switching element,
   capacitive means for coupling said control electrode of said first switching element to said junction, and
   biasing circuit means for supplying an electric potential to said control electrode of said first switching element such that said first switching element is rendered substantially conductive by the potential applied to the control electrode thereof when said second switching element is in a nonconductive state;
   b. a signal input circuit for supplying to said monostable multivibrator circuit a trigger pulse signal generated in response to an electric signal to be measured; and
   c. detecting means for deriving an output signal developed at said monostable multivibrator circuit in response to said trigger pulse signal from said monostable multivibrator circuit.

2. A counting device according to claim 1, wherein said capacitive means comprises a series circuit of a resistor and a capacitor.

3. A counting device according to claim 1, wherein said second direct current means comprises resistance means.

4. A counting device according to claim 3, said resistance means includes an internal resistance in a moving-coil ammeter.

5. A counting device according to claim 1, wherein said detecting means comprises a moving-coil ammeter coupled in said monostable multivibrator circuit.

6. A counting device comprising:
   a. a monostable multivibrator circuit including first and second conductive lines,
   a voltage supply for applying an energizing potential connected between said first and second conductive lines,
   first and second switching elements each having first and second electrodes separated by a conductive path for said switching elements, and a control electrode for controlling the conductivity of the conductive path,
   a series circuit of a first load resistor and a zener diode connected between said first and second conductive lines so that one end of the load resistor in said series circuit is connected with said first conductive line,
   first direct current conductive means for connecting each of said second electrodes with said second conductive line,
   a second load resistor connected between the first electrode of said first switching element and said first conductive line,
   second direct current conductive means for connecting said first electrode of said second switching element with the junction of said first load resistor and said zener diode so as to make said first load resistor act as a load for said second switching element in the conductive state thereof and as a load for said zener diode in the nonconductive state of said second switching element,
   third direct current conductive mans for coupling said first electrode of said first switching element to the control electrode of said second switching element,
   capacitive means for coupling said control electrode of said first switching element to said junction, and
   biasing circuit means for supplying an electric potential to said control electrode of said first switching element such that said first switching element is rendered substantially conductive by the potential applied to the control electrode thereof when said second switching element is in a nonconductive state;
   b. a signal input circuit for supplying to said monostable multivibrator circuit a trigger pulse signal generated in response to an electric signal to be measured; and
   c. detecting means for deriving an output signal developed at said monostable multivibrator circuit in response to said trigger pulse signal from said monostable multivibrator circuit, wherein said second direct current conductor means comprises unidirectional diode means.

7. A counting device comprising:
   a first and a second conductive line, a voltage supply for applying an energizing potential connected between said first and second conductive lines, first, second and third switching elements each having first and second electrodes separated by a conductive path for said switching elements and a control electrode for controlling the conductivity of the conductive path, a first series circuit of a first resistor and a zener diode connected between said first and second conductive lines so that one end of the first resistor in said first series circuit is connected with said first conductive line, first direct current conductive means for connecting said second electrode of said first switching element with said second conductive line, a second resistor connected between the first electrode of said first switching element and said first conductive line, second direct current conductive means for connecting said first electrode of said second switching element with the junction of said first resistor and said zener diode, third direct current conductive means for coupling said first electrode of said first switching element to the control electrode of said second switching element, capacitive means for coupling said control electrode of said first switching element to said junction, fourth direct current conductive means for connecting said second electrode of said second switching element with said control electrode of said third switching element, fifth direct current conductive means for connecting said second electrode of said third switching element with said second conductive line, a second series circuit of a third resistor and an ammeter connected between said first electrode of said third switching element and said first conductive line, biasing circuit means for supplying an electric potential to said control electrode of said first switching element such that said first switching element is rendered substantially conductive by the electric potential applied to the control electrode thereof when said second and third switching element is in a nonconductive state, and a signal input circuit for supplying to one of said switching elements a trigger pulse signal generated in response to an electric signal to be measured.

8. A counting device comprising:

a. a monostable multivibrator circuit including a first and a second conductive line, a voltage supply for applying an energizing potential connected between said first and second conductive lines, first and second switching means each having first and second electrodes separated by a conductive path for said switching means and a control electrode for controlling the conductivity of the conductive path, a series circuit of a first resistor and a zener diode connected between said first and second conductive lines so that one end of the first resistor in said series circuit is connected with said first conductive line, first direct current conductive means for connecting each of said second electrodes with said second conductive line, a second resistor connected between the first electrode of said first switching means and said first conductive line, a third resistor connected between the first electrode of said second switching means and said first conductive line, unidirectional diode means for coupling said first electrode of said second switching means to the junction of said first resistor and zener diode, second direct current conductive means for coupling said first electrode of first switching means to the control electrode of said second switching means, capacitive means for coupling said control electrode of said first switching means to said junction, and biasing circuit means for supplying an electric potential to said control electrode of said first switching means such that said first switching means is rendered substantially conductive by the electric potential applied to the control electrode thereof when said second switching means is in a nonconductive state;

b. a signal input circuit for supplying said monostable multivibrator circuit a trigger pulse signal generated in response to an electric signal to be measured; and c. detecting means for deriving an output signal developed at said monostable multivibrator circuit in response to said trigger pulse signal from said monostable multivibrator circuit.

* * * * *